(12) United States Patent
Ramilo et al.

(10) Patent No.: US 12,347,435 B1
(45) Date of Patent: Jul. 1, 2025

(54) ANALYSIS OF AND NOTATION OF COMMUNICATIONS

(71) Applicant: Wells Fargo Bank, N.A., San Francisco, CA (US)

(72) Inventors: Ray Joanna Luz Reyes Ramilo, Parañaque (PH); Dennis Emmanuel Montenegro, Concord, CA (US); Manpreet Singh, Hyderabad (IN); Ananya Bandyopadhyay, Ranchi (IN); Prakash Jagannathan, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 331 days.

(21) Appl. No.: 17/818,618

(22) Filed: Aug. 9, 2022

(51) Int. Cl.
  *G10L 15/26* (2006.01)
  *G06Q 30/016* (2023.01)
  *H04M 3/51* (2006.01)

(52) U.S. Cl.
  CPC .......... *G10L 15/26* (2013.01); *G06Q 30/016* (2013.01); *H04M 3/5175* (2013.01)

(58) Field of Classification Search
  CPC ..... G10L 15/26; G06Q 30/016; H04M 3/5175
  See application file for complete search history.

(56) References Cited

U.S. PATENT DOCUMENTS

| | | | |
|---|---|---|---|
| 9,160,852 B2 | 10/2015 | Ripa et al. | |
| 10,554,817 B1 | 2/2020 | Sullivan et al. | |
| 10,601,992 B2 | 3/2020 | Dwyer et al. | |
| 10,839,322 B2 | 11/2020 | Pattabhiraman et al. | |
| 2005/0027525 A1* | 2/2005 | Funakura | G10L 17/26 704/235 |
| 2018/0351887 A1* | 12/2018 | Efrati | G06Q 50/06 |

* cited by examiner

*Primary Examiner* — Ibrahim Siddo
(74) *Attorney, Agent, or Firm* — Shumaker & Sieffert, P.A.

(57) ABSTRACT

This disclosure describes techniques that include facilitating note-taking in various contexts, including when a customer is speaking to an agent of a business. In one example, this disclosure describes a method that includes analyzing, by a computing system, communications between a customer of an organization and an agent of the organization, where the communications include an issue to be addressed by the organization; generating, by the computing system, artifacts of the communication between the customer and the agent; determining, based on the artifacts of the communication, an action to be taken to address the issue; and generating, by the computing system, a user interface providing options associated with addressing the issue.

20 Claims, 7 Drawing Sheets

301A

[UserForm1 dialog showing tabs: Main Memos, Call Memos, Claim Memos, Fees, Cr Override Memos; sub-tabs: Inbound, Outbound; text area with "Called CH @ d/t"; checkboxes under In-Wallet / Out-of-Wallet: Password, Originating State, other Signers, DOB co-signers, email, Tran History; buttons: CH, passed, failed, tf, statused U, Clear]

ANALYSIS OF AND NOTATION OF COMMUNICATIONS

TECHNICAL FIELD

This disclosure relates to computing systems, and more specifically, to systems for facilitating accurate recordkeeping and resolution of issues discussed during a conversation, such as between a customer and an agent of a business.

BACKGROUND

Bank customers often need to talk to bank representatives to address issues with their bank account(s), and in such a situation, bank customers sometimes prefer to initiate a call to their bank to speak to an agent of the bank. Some issues that bank customers seek to address are complex and/or require time to be solved.

SUMMARY

This disclosure describes techniques that include facilitating note-taking and actions to be taken in various contexts, including when a customer is speaking to an agent of a business. Techniques described herein might apply, for example, to a banking customer speaking to a representative of a bank. Techniques described herein may include leveraging a speech-to-text (STT) algorithm and/or one or more natural language processing (NLP) algorithms to generate various artifacts associated with an interaction between two or more parties to a conversation. Such artifacts may include a transcript of a phone or video conversation, notes taken by a party to the conversation, action items mentioned or predicted/derived from the conversation, potential resolutions of issues raised during the conversation, communications or potential communications with others outside the conversation, word clouds representing on how words are used in the conversation (e.g., based on frequency, emphasis, tone), and other visual representations of spoken words or other communications associated with each party to the conversation or associated with communications between parties to the conversation.

The techniques described herein may provide certain technical advantages. For example, by analyzing a conversation and generating data or other artifacts associated with the conversation, not only can participants on the call devote more attention to issues being discussed (i.e., rather than making notes), but such analysis and artifact generation may result in a more accurate reflection or memorialization of issues discussed during the call than any manually-taken notes by participants on the call. Effectively, by providing note-taking tools that facilitate, supplement, or even replace contemporaneous note-taking efforts made by a party to a conversation, the resulting call artifacts will be more accurate. Based on these more accurate artifacts, it may be possible to more accurately identify an appropriate course of action pertaining to the issues raised during the conversation. In addition, further processing of such artifacts may be used to generate a user interface that presents context-appropriate action items or selectable action triggers. Selection of such an action trigger by a party to the conversation may cause the corresponding resolution action to execute.

In some examples, this disclosure describes operations performed by a computing system in accordance with one or more aspects of this disclosure. In one specific example, this disclosure describes a method comprising analyzing, by a computing system, a communication between a customer of an organization and an agent of the organization, where the customer raises an issue to be addressed by the organization; generating, by the computing system, artifacts of the communication between the customer and the agent; determining, based on the artifacts of the communication, an action to be taken to address the issue raised by the customer; and generating, by the computing system, a user interface providing options associated with addressing the issue raised by the customer.

In another example, this disclosure describes a system comprising a storage system and processing circuitry having access to the storage system, wherein the processing circuitry is configured to carry out operations described herein. In yet another example, this disclosure describes a computer-readable storage medium comprising instructions that, when executed, configure processing circuitry of a computing system to carry out operations described herein.

BRIEF DESCRIPTION OF THE DRAWINGS

FIG. 3A through FIG. 3C are conceptual diagrams illustrating user interfaces presented by an agent computing device for facilitating record-keeping, note-taking, and process management, in accordance with one or more aspects of the present disclosure.

DETAILED DESCRIPTION

Customers of organizations in many industries, including the banking industry, tend to prefer personal interactions with agents when seeking help with services. Often, a banking customer will initiate a phone, audio, or video call to a bank when seeking help. Such a call may ultimately be handled by a call center that is staffed with agents or representatives of the bank. Successful resolution of the customer's requests depends greatly on the representative's ability to understand the customer's concern and appropriately address those concerns. Bank agents or representatives may sometimes need to take notes when handling a call initiated by a banking customer. If such notes are manually written or typed, it may be difficult for a representative to accurately record all of the customers issues, comments, concerns, and suggestions. Some points mentioned by bank customers may therefore be missed by the representative, which could lead to inaccurately identifying or determining an appropriate resolution to the customer's issue(s). Failure by the bank to resolve issues can lead to the customer's dissatisfaction with the services being provided by the representative and/or the bank. Inaccurately determining the appropriate resolution to the customer's issue also tends to lead to longer resolution times, further increasing the risk of a customer being dissatisfied.

Described herein is an automated system that performs one or more actions based on problems/queries raised by a bank customer during a call with a bank representative. For example, the system transcribes the conversation between the banking customer and the bank representative (i.e., a customer support agent), thereby capturing the issues and queries raised by the bank customer. In some examples, the system then generates a customer word cloud and an agent word cloud based on the conversation between the bank customer and bank agent. The word clouds may include relevant and important text/words from the transcribed call, which may help reduce the agent's burden in making notes of the topics discussed during the conversation. The word clouds may be displayed to the bank agent. Further, based on the generated customer word cloud and agent word cloud, the system determines suitable options/banking actions to be performed. The system may generate a user interface for the bank agent based on the determined banking action. The bank agent accordingly selects the banking action(s) to be performed for solving the problem raised by the bank customer.

Figure 1:
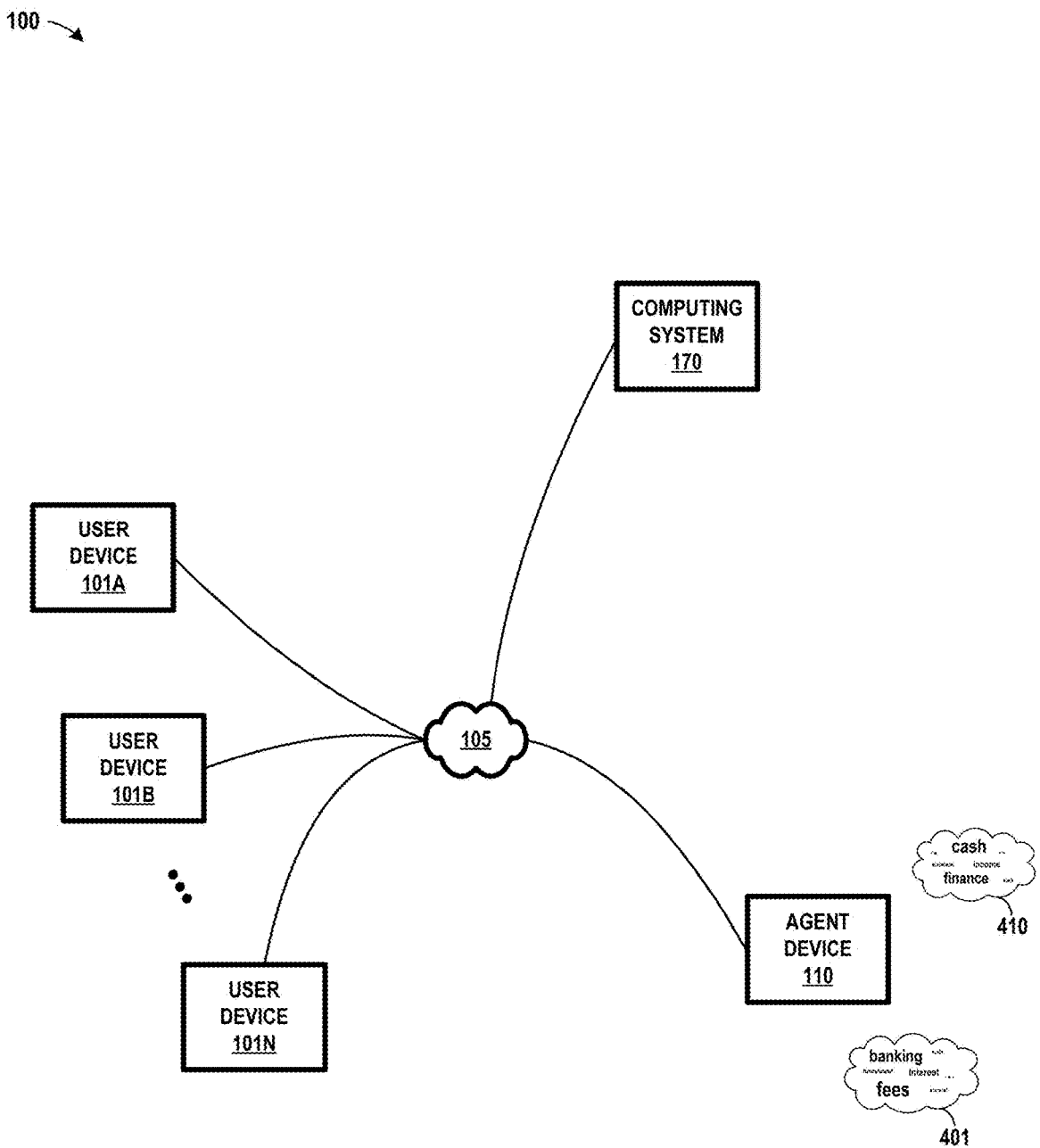
FIG. 1 is a conceptual diagram illustrating an example system for facilitating record-keeping, note-taking, and process management between an agent and one or more users, in accordance with one or more aspects of the present disclosure.

FIG. 1 is a conceptual diagram illustrating an example system for facilitating record-keeping, note-taking, and process management between an agent and one or more users, in accordance with one or more aspects of the present disclosure. System 100 in FIG. 1 includes agent device 110, computing system 170, and representations of a number of user devices 101A through 101N, collectively "user devices 101"), all capable of communicating over network 105.

Computing system 170 may be operated, owned, or controlled by a business, entity, organization, or bank (hereinafter "organization" or "bank"). In some examples, computing system 170 may be capable of performing various support functions associated with communications between agents and customers, including natural language processing, communication analysis, word cloud generation, and account information services (e.g., using an account information database). Computing system 170 may also be capable of identifying and/or performing actions appropriate for a particular customer (e.g., based on information derived from a conversation between an agent and a customer).

Agent device 110 may be operated by an agent or representative of the organization, and may be used in the context of a call center or customer support service. In such an example, agent device 110 is configured to serve as a tool used by a human agent of the organization, and may have access to various tools and/or information sources to facilitate providing support to customers of the organization that may initiate contact with the organization. In some cases, such tools and/or information sources used by agent device 110 may include computing system 170. In some examples, the agent or representative that operates agent device 110 may be an employee of the organization. In other examples, the agent or representative may be a contractor hired by the organization.

Both computing system 170 and agent device 110 may be implemented through any suitable computing system, including one or more server computers, workstations, mainframes, appliances, cloud computing systems, and/or other computing devices that may be capable of performing operations and/or functions described in accordance with one or more aspects of the present disclosure. In other examples, such computing systems may represent or be implemented through one or more virtualized compute instances (e.g., virtual machines, containers) of a data center, cloud computing system, server farm, and/or server cluster.

Each of user devices 101 may be operated by a user or customer of the organization. In at least some contexts described herein, a user or customer of the organization uses one of user devices 101 to initiate contact with the organization to get service, present an inquiry, or otherwise communicate with the organization. Such contact with the organization results in that user device 101 being in communication with a human agent of the organization operating agent device 110. Accordingly, each of user devices 101 may be any suitable computing system including a mobile, non-mobile, wearable, and/or non-wearable computing device, typically a mobile phone or tablet, or a laptop or desktop computing device. Other possible user devices 101 may include a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, or any other type of wearable, non-wearable, mobile, or non-mobile computing device that may perform operations in accordance with one or more aspects of the present disclosure.

To interact with the organization (i.e., specifically, with agent device 110), a user operating one of user devices 101 communicates with agent device 110 over network 105. Network 105 may be the internet or may include or represent any public or private communications network or other network. For instance, network 105 may be or may include a cellular, Wi-Fi®, ZigBee, Bluetooth, Near-Field Communication (NFC), satellite, enterprise, service provider, and/or other type of network enabling transfer of transmitting data between computing systems, servers, and computing devices. Although customer interactions with the organization are primarily described herein as involving one or more of user devices 101 communicating over network 105, interactions as described herein may take other forms. For example, such interactions might also involve physical interactions between a user and an organization, such as a user visiting a bank branch, a user attending a retail office, or otherwise.

In FIG. 1, and in accordance with one or more aspects of the present disclosure, one or more user devices 101 may interact with agent device 110. For instance, in an example that can be described in the context of FIG. 1, user device 101A detects input that it determines corresponds to a request to communicate over network 105. User device 101A outputs a signal over network 105. Agent device 110 detects a signal and determines that it corresponds to a request from a user device to communicate. Agent device 110 establishes communications with user device 101A. User device 101A and agent device 110 each output signals over 105 corresponding to communications (e.g., images or speech) between the user operating user device 101A (i.e., the customer) and the user operating agent device 110 (the organization's agent).

Agent device 110 may interact with 170 to obtain supporting services for an ongoing call. For instance, continuing with the example being described in the context of FIG. 1, agent device 110 outputs information about the communications taking place between the customer and agent (operating user device 101A and agent device 110, respectively) to computing system 170. Computing system 170 processes the information and generates artifacts associated with the communications. In some examples, such artifacts may include a transcription of the conversation between the customer and agent (i.e., the users of user device 101A and agent device 110). Computing system 170 outputs a signal over network 105. Agent device 110 detects a signal and determines that the signal corresponds to artifacts associated with the communications that are taking place between user device 101A and agent device 110. In some examples, the artifacts include information sufficient to present a user interface at agent device 110. Such a user interface may assist the agent operating agent device 110 in handling and/or processing requests made by the customer operating user device 101A during the call. In other examples, the artifacts may include information enabling agent device 110 to generate a user interface for presentation at agent device 110.

Figure 4A:
FIG. 4A is a conceptual diagram illustrating an example word cloud corresponding to words spoken by a banking customer, in accordance with one or more aspects of the present disclosure.
Figure 4B:
FIG. 4B is a conceptual diagram illustrating an example word cloud corresponding to words spoken by an agent or bank representative, in accordance with one or more aspects of the present disclosure.

While communications between user device 101A and agent device 110 are taking place, agent device 110 may generate a user interface presenting one or more banking actions that can be taken in order to resolve the issue or query raised by the customer. In some examples, such actions are determined by computing system 170 based on word clouds generated by computing system 170. Such word clouds may be derived from a transcribed conversation between the customer and bank representative. Example word clouds are illustrated in FIG. 4A and FIG. 4B, and are illustrated in FIG. 1 as customer word cloud 401 and agent word cloud 410. Such word clouds can be used as the basis for a user interface presented by agent device 110.

The word clouds may be generated based on a frequency, volume, tone, and emotion of the bank customer (i.e., the user operating user device 101A) while that bank customer is speaking. Performing a transcription will tend to reduce the possibility that some points raised or mentioned by the bank customer during the conversation with the agent will be missed or not addressed. In some examples, such a user interface may present, based on the word clouds and/or the transcription, action item options that are relevant to the query or issue raised by the customer. Similarly, and also based on the word clouds and/or the transcription, the action item options that are not relevant the conversation may be omitted from such a user interface. In this way, the more relevant information can be presented by agent device 110 to the agent, and less relevant information and/or options can be omitted, enabling the agent to focus on the more relevant actions without distraction by irrelevant options.

In some respects, system 100 may serve as a predictive resolution system configured to resolve customer conflicts, based on recorded and/or monitored interactions between a user of user device 101A and agent device 110. Computing system 170 may use a feature word weighting algorithm to determine the one or more key feature words (e.g., words) used during the interaction which should be included in the visual representation (e.g., word clouds 401 and/or 410). In some examples, computing system 170 may use a feature word weighting algorithm to determine the one or more feature word characteristics (e.g., size, color, shape, etc.) for each feature word depicted in a user interface presented by agent device 110. Agent device 110 may, based on further communications and interactions with computing system 170, update a visual representation (e.g., presented in a user interface at agent device 110) in near real-time or seemingly near real-time such that the one or more visual representations may reflect up-to-date information and/or a progression of the interaction.

To generate a user interface, computing systems 170 may use an action determination algorithm to process the interaction transcript to determine one or more resolution actions that may be performed to resolve any customer issues. The action determination algorithm may be a trained machine learning model. Additionally or alternatively, the computing system 170 may employ one or more image processing techniques. Computing system 170 may also determine a feature vector for each feature word included in a word cloud or other visual representation, and then process the one or more feature vectors to determine one or more resolution actions. In some examples, determining one or more resolution actions may include determining the action by identifying a word spoken by both the customer and by the agent and identifying dependencies between use of the word spoken by both the customer and by the agent. Such dependencies may include the tone, emotion, and/or frequency of the word as spoken by both the customer and agent. For example, if a given word used frequently by both the customer and the agent (e.g., "fee") is used with a similar tone or with a similar degree of emotion by both the customer and the agent, computing system 170 may identify one or more resolution actions based primarily on that word or the subject matter of that word (e.g., providing an option to refund, reduce, or adjust fees).

Computing systems 170 may generate user interface data for use in presenting a user interface at agent device 110 that facilitates one or more resolution actions to be taken by the agent operating agent device 110. Such user interface data may include instructions for rendering one or more resolution action interactable triggers for display to the institution representative via the institution representative device. Upon interaction with a resolution action interactable trigger by the agent operating agent device 110, computing system 170 may cause the corresponding resolution action to execute.

The techniques described herein may provide other technical advantages. For example, through analysis of conversations and other artifacts associated with the conversation, an agent may be more effective at taking notes and/or listening to the concerns of a customer, and better able to identify a customer's primary concerns. If an agent can focus on a customer's primary concerns, computing cycles can be more appropriately allocated to important tasks, since computing cycles can be devoted primarily to those concerns, and less computing cycles can be allocated to less important concerns.

Figure 2:
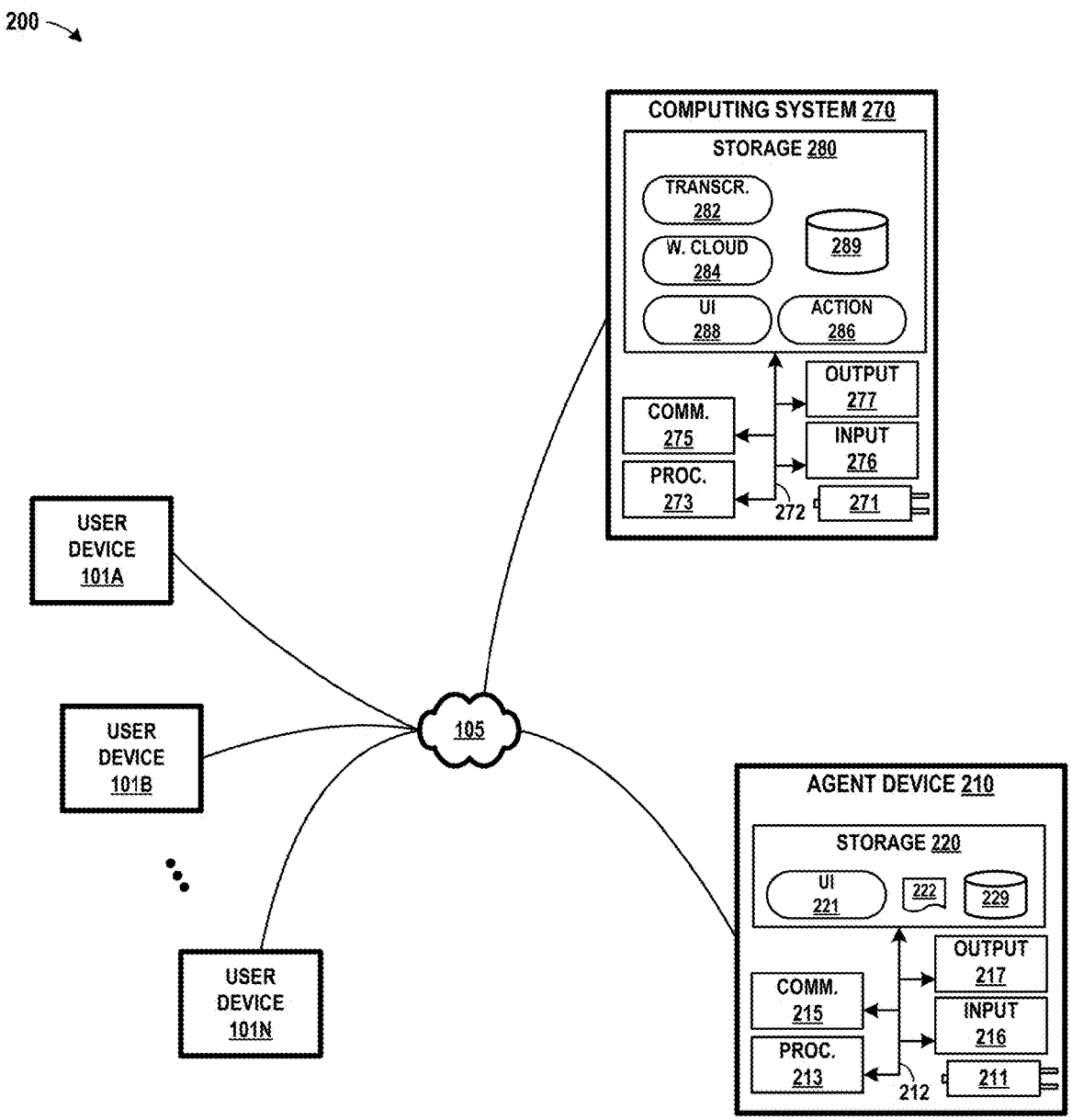
FIG. 2 is a block diagram illustrating an example system for facilitating record-keeping, note-taking, and process management between an agent and one or more users, in accordance with one or more aspects of the present disclosure.

FIG. 2 is a block diagram illustrating an example system for facilitating record-keeping, note-taking, and process management between an agent and one or more users, in accordance with one or more aspects of the present disclosure. FIG. 2 is similar to FIG. 1, but includes detail views of both computing system 270 and agent device 210. Computing system 270 of FIG. 2 may correspond to computing system 170 of FIG. 1, and may be considered an example implementation of computing system 170 of FIG. 1. Similarly, agent device 210, as shown in FIG. 2, may correspond to agent device 110 of FIG. 1, and may be considered an example or sample implementation of agent device 110 of FIG. 1. In addition, user devices 101 of FIG. 2 may correspond to user devices 101 of FIG. 1, and network 105 of FIG. 2 may correspond to network 105 of FIG. 1. In general, like-numbered elements may represent previously-described elements in a manner consistent with prior descriptions.

In FIG. 2, computing system 270 is illustrated as including underlying physical hardware that includes power source 271, one or more processors 273, one or more communication units 275, one or more input devices 276, one or more output devices 277, and one or more storage devices 280. Storage devices 280 may include transcription module 282, word cloud module 284, action module 286, user interface module 288, and data store 289. One or more of the devices, modules, storage areas, or other components of computing system 270 may be interconnected to enable inter-component communications (physically, communicatively, and/or operatively). In some examples, such connectivity may be provided by through communication channels, which may include a system bus (e.g., communication channel 272), a network connection, an inter-process communication data structure, or any other method for communicating data.

Power source 271 of computing system 270 may provide power to one or more components of computing system 270. One or more processors 273 of computing system 270 may implement functionality and/or execute instructions associated with computing system 270 or associated with one or more modules illustrated herein and/or described below. One or more processors 273 may be, may be part of, and/or may include processing circuitry that performs operations in accordance with one or more aspects of the present disclosure. One or more communication units 275 of computing system 270 may communicate with devices external to computing system 270 by transmitting and/or receiving data, and may operate, in some respects, as both an input device and an output device. In some or all cases, communication unit 275 may communicate with other devices or computing systems over network 105 or over other networks.

One or more input devices 276 may represent any input devices of computing system 270 not otherwise separately described herein, and one or more output devices 277 may represent any output devices of computing system 270 not otherwise separately described herein. Input devices 276 and/or output devices 277 may generate, receive, and/or process output from any type of device capable of outputting information to a human or machine. For example, one or more input devices 276 may generate, receive, and/or process input in the form of electrical, physical, audio, image, and/or visual input (e.g., peripheral device, keyboard, microphone, camera). Correspondingly, one or more output devices 277 may generate, receive, and/or process output in the form of electrical and/or physical output (e.g., peripheral device, actuator).

One or more storage devices 280 within computing system 270 may store information for processing during operation of computing system 270. Storage devices 280 may store program instructions and/or data associated with one or more of the modules described in accordance with one or more aspects of this disclosure. One or more processors 273 and one or more storage devices 280 may provide an operating environment or platform for such modules, which may be implemented as software, but may in some examples include any combination of hardware, firmware, and software. One or more processors 273 may execute instructions and one or more storage devices 280 may store instructions and/or data of one or more modules. The combination of processors 273 and storage devices 280 may retrieve, store, and/or execute the instructions and/or data of one or more applications, modules, or software. Processors 273 and/or storage devices 280 may also be operably coupled to one or more other software and/or hardware components, including, but not limited to, one or more of the components of computing system 270 and/or one or more devices or systems illustrated or described as being connected to computing system 270.

Data store 289 of computing system 270 may represent any suitable data structure or storage medium for storing information relating to bank account information pertaining to each customer having an account registered with the respective bank. Data store 289 may include the name of each customer, the ID of each customer, the account numbers of each customer, date of birth of each customer, addresses of each customer, and the like. The information stored in data store 189 may be searchable and/or categorized such that one or more modules within computing system 170 may provide an input requesting information from data store 189, and in response to the input, receive information stored within data store 189. Data store 189 may be primarily maintained by analysis module 186.

Transcription module 282 may perform functions relating to transcribing a call between a bank customer and bank agent or representative. The transcription component notes all the words spoken by the bank customer and bank representative during their conversation, and accordingly arranges all the words into a written format in the form of sentences. The transcription component may simultaneously perform the transcription while the conversation between the bank customer and bank representative is taking place.

Word cloud module 284 may perform functions relating to using transcribed call information from transcription module 282 to generate word clouds. In some examples, word clouds are generated during a conversation between a customer and an agent. A customer word cloud may be generated while the customer is speaking, and the agent word cloud may be generated while the bank representative is speaking. The customer word cloud is generated based on the frequency of words used and an emphasis placed on the words spoken by the bank customer. Emphasis may be determined based on a volume, tone, and emotion of the bank customer while speaking. The agent word cloud is generated based on the frequency of words used and an emphasis placed on the words while the bank representative is speaking. The customer word cloud and the agent word cloud can be presented in a user interface at agent device 210 while the bank customer and bank agent are speaking.

In some examples, word cloud module 284 may be configured to update a user interface to change the size and/or color of the words in the customer and agent word clouds, as the bank customer and bank representative speak. Word cloud module 284 may use a weighing/ranking mechanism for ranking top words (for example top 10 words) spoken by the bank customer and bank representative, respectively. Based on the ranking, word cloud module 284 may adjust the weight of words in a word cloud to increase/decrease the importance or relevance of the words (e.g., by changing size and/or color based on the frequency, emphasis, and tone of the bank customer while speaking).

Action module 286 may perform functions relating to recommending and/or performing actions, often based on the word clouds generated by word cloud module 284. Action module 286 may determine an appropriate banking action to be taken based on the generated word clouds. For instance, action module 286 may analyze the generated word clouds using an action determination algorithm. Action module 286 may determine vectors for each word/phrase in the generated word clouds, and then add each determined vector for determining optimal boundaries. Based on the determined optimal boundary, an action determination algorithm may group the generated word clouds with suitable banking actions from a plurality of banking actions, and accordingly determine the correct action to be taken.

User interface module 288 performs functions relating to generating, presenting, and/or causing to be presented various user interfaces to facilitate tasks performed by an operator of agent device 110 (e.g., a bank representative or agent). User interface module 288 may receive an indication of an action to be taken from action module 286, and based on this information, generate a user interface that, when presented at agent device 110, enables the agent to perform or enable the correct banking action to be taken. The bank representative may, for example, select a displayed banking action to be taken in order to resolve the bank customer problem/query. User interface module 288 may also refrain from presenting in a user interface (or remove from the user interface) irrelevant action items or action options that are not related to the problem/query stated by the bank customer during the conversation with the bank representative. In this way, incorrect or ill-advised banking actions are less likely to be performed by the bank representative. For instance, if a bank customer has a query regarding best mutual funds for long term investment, user interface module 288 might present a list of mutual fund options on the user interface for which the bank customer is eligible. However, user interface module 288 might refrain from presenting irrelevant investment options based on the conversation-defined context, such as those relating to short-term investing, hybrid investing, or others.

In some examples, user interface module 288 may cause computing system 270 to forward a bank customer's problem/query to a more experienced bank representative in cases where the current bank representative is unable to address the user's inquiry. Such a process may be automated, requiring little or no action by the agent. In some cases, such a process may enable an agent to avoid spending time searching for or contacting other agents, employees, or other resources. Such a process will tend to save time for both the bank customer as well as the agent. Further, in some examples user interface module 288 may be configured to automatically send a communication or alert (e.g., an email) to both the bank customer and the agent, summarizing what happened during their conversation. In such an example, both the bank customer and bank representative will have information enabling recollection of the issues, concerns, and other points discussed during the conversation. In other examples, user interface module 288 may cause action module 286 to predict issues/problems that the bank customer is facing with his or her bank account based on a recent history of the bank account. If predicted issues are identified, user interface module 288 may present, within a user interface, solutions for solving the identified issues, perhaps based on bank customers who have also faced similar problems.

In the example of FIG. 2, agent device 210 is also illustrated as including underlying physical hardware, and such hardware may include power source 211, one or more processors 213, one or more communication units 215, one or more input devices 216, one or more output devices 217, and one or more storage devices 220 (communicating over communication channel 212). These components may be implemented in the manner described with respect to similar components (e.g., those of computing system 270) described elsewhere herein. For example, power source 211 may provide power to one or more components of agent device 210. One or more processors 213 may implement functionality and/or execute instructions associated with agent device 210 or associated with one or more modules of agent device 210. One or more communication units 215 of agent device 210 may communicate with devices external to agent device 210 by transmitting and/or receiving data over a network or otherwise. One or more input devices 216 and output devices 217 may generate, receive, and/or process input and output, respectively. One or more storage devices 220 may store program instructions and/or data associated with one or more of the modules stored within storage devices 220 in accordance with one or more aspects of this disclosure.

For various user devices 210, input devices 216 and output devices 217 may each function as an input and/or output device or set of input/output devices for a given agent device 210, and may be implemented using various devices, components, and/or technologies. For example, input devices 216 and output devices 217 may include one or more user interface devices that include presence-sensitive input panel technologies, microphone technologies, voice activation and/or recognition technologies, cameras, sensor technologies (e.g., infrared, image, location, motion, accelerometer, gyrometer, magnetometer), or other input device technology for use in receiving user input. Such user interface devices may include display devices, speaker technologies, haptic feedback technologies, tactile feedback technologies, light emitting technologies, or other output device technologies for use in outputting information to a user.

Storage devices 220 of agent device 210 may include various modules, such as user interface module 221 and data store 229. User interface module 221 may perform functions relating to presenting audio, visual, or other information, such as through audio devices, display screens, haptic feedback devices, or otherwise. User interface module 221 may also act as an interface for receiving input from a user, through touch interactions, voice commands, or otherwise.

Data store 229 may represent any suitable data structure or storage medium for storing information related to operations performed by agent device 210. The information stored in data store 229 may be searchable and/or categorized such that one or more modules within agent device 210 may provide an input requesting information from data store 229, and in response to the input, receive information stored within data store 229. Data store 229 may be primarily maintained by user interface module 221.

Modules illustrated in FIG. 2 (e.g., transcription module 282, word cloud module 284, action module 286, user interface module 288, and user interface module 221) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 3A is a conceptual diagram illustrating a user interface that may be presented by an agent computing device for facilitating record-keeping, note-taking, and process management, in accordance with one or more aspects of the present disclosure. As illustrated in FIG. 3A, agent user interface 301A illustrates a window-based user interface having a number of tabs across the top of the window and other user interface controls elsewhere within the window. Each tab may correspond to a specific topic that an agent may discuss with a customer during a communication with the customer, and each tab may present various options enabling an agent to perform relevant actions pertaining to that task. For example, such actions may involve an agent efficiently making notes during a communication, checking boxes representing issues discussed during a call, communicating with other personnel during the call, and/or otherwise initiating actions that may help resolve issues arising from the call.

In some examples, each tab along the top of the window, when selected, may present a situation-specific user interface providing appropriate options for the selected situation. For example, in FIG. 3A, the "Call Memos" tab is currently selected, which presents a text box for notes, a number of checkboxes (categorized as "in-wallet" and "out-of-wallet"), and a number of buttons ("CH," "failed," as well as others) that may be appropriate for "Call Memos" tasks to be performed during or after a call that an agent conducts with a customer. Selection of the "Fees" tab, on the other hand, may cause agent device 210 to present, within agent user interface 301A, text boxes, buttons, and/or other user interface features pertaining to fees (e.g., enabling the refund or adjustment of fees). In another example, selection of the "Cr Override Memos" may cause agent user interface 301A to present options that enable the agent to make notes about a credit override that may be applied to a customer's account and/or to actually perform the credit override. Other tabs illustrated within agent user interface 301A (and other user interfaces shown herein) may present other options.

In FIG. 3A, and in accordance with one or more aspects of the present disclosure, agent device 210 may present agent user interface 301A in response to communications with one or more user devices 101. For instance, in an example that can be described with reference to both FIG. 2 and FIG. 3A, user device 101A detects input that it determines corresponds to a request to communicate over network 105. User device 101A outputs a signal over network 105. Communication unit 215 of agent device 210 detects a signal over network 105. Communication unit 215 establishes bidirectional communications with user device 101A over network 105. Communication unit 215 outputs an indication of the communications to user interface module 221 of agent device 210. User interface module 221 causes output device 217, which may correspond to a display screen associated with agent device 210, to present a user interface at agent device 210. In some examples, the user interface may correspond to agent user interface 301A of FIG. 3A. Further, in some examples, the specific type of user interface presented at agent device 210 (or the tab within the user interface) may be determined based on input detected by agent device 210 (e.g., from a user of agent device 210), or based on information about the communications between user device 101A and agent device 210.

Agent device 210 may collect information about communications between a user of user device 101A and a user of agent device 210. For instance, continuing with the example being described in the context of FIG. 2 and FIG. 3A, input device 216 of agent device 210 detects input and outputs information about the input to user interface module 221. User interface module 221 determines that the input corresponds to an indication that a user selected one or more buttons or other controls within a user interface presented by agent device 210. In some examples, a user operating agent device 210 may select a button within a user interface (e.g., agent user interface 301A) to quickly memorialize a topic discussed, and issue raised, a problem identified, a problem resolved, or other information addressed during the call. By selecting a button (where the button has been pre-configured to correspond to a specific item of information) or otherwise interacting with a control within a user interface, the user of agent device 210 may be able to memorialize information discussed during a call more quickly than taking notes manually.

Computing system 270 may store information about notes taken by a user of agent device 210. For instance, again continuing with the example being described in the context of FIG. 2 and FIG. 3A, user interface module 221 causes communication unit 215 to output a signal over network 105. Communication unit 275 of computing system 270 detects a signal and outputs information about the signal to user interface module 288. User interface module 288 determines that the signal incudes information about notes taken by a user of agent device 210 or an indication of buttons selected, checkboxes selected, or some other interaction with a user interface presented at agent device 210. User interface module 288 causes information about the interaction to be stored within data store 289 for later use and/or analysis (e.g., by action module 286 or transcription module 282).

Computing system 270 may generate artifacts derived from communications between a user of user device 101A and a user of agent device 210. For instance, still continuing with the example being described in the context of FIG. 2 and FIG. 3A, input device 216 detects input and outputs information about the input to user interface module 221. User interface module 221 determines that the input corresponds to information about communications taking place between a user of agent device 210 and a user of user device 101A (e.g., audio of a voice conversation). User interface module 221 causes 215 of agent device 210 to output a signal over network 105. Communication unit 275 of computing system 270 detects a signal and outputs information about the signal to transcription module 282 of computing system 270. Transcription module 282 of computing system 270 analyzes the information about the signal and generates one or more artifacts, which may be information derived from communications between a user of user device 101A and a user of FIG. 21. In some examples, transcription module 282 generates a transcript artifact by transcribing speech included within the communications between the user operating user device 101A and the user operating agent device 210. Transcription module 282 stores the transcription and/or other artifacts within data store 289 for later user and/or analysis.

Computing system 270 may generate a word cloud based on communications between user device 101A and agent device 210. For instance, referring again to the example being described within the context of FIG. 2, transcription module 282 generates a transcript, as described above, and outputs information about the transcript to word cloud module 284. Word cloud module 284 analyzes the transcript and parses the words used by the user (e.g., customer) operating user device 101A and the user (e.g., agent) operating agent device 210. In some examples, word cloud module 284 generates two word clouds: a word cloud for the words spoken by the customer operating user device 101A, and a word cloud for words spoken by the agent operating agent device 210. Each word cloud may be generated based on the frequency of words and/or the emphasis used by the speaker. Emphasis may be determined based on the volume, tone, and/or emotion of the speaker.

Computing system 270 may cause word clouds to be presented at agent device 210. For instance, still continuing with the example being described with reference to FIG. 2 and FIG. 3A, word cloud module 284 may cause 275 to output a signal over network 105. Communication unit 215 of agent device 210 may detect a signal and output information about the signal to user interface module 221. User interface module 221 may determine that the signal corresponds to information sufficient to generate a user interface illustrating one or more word clouds. User interface module 221 presents a user interface illustrating one or more word clouds. In some examples, the word clouds may take a form similar to that illustrated in FIG. 4A and FIG. 4B, with separate word clouds for the user operating user device 101A and the user operating agent device 210. Further, in some examples, the word clouds may change or update in a dynamic fashion as further communications take place between user device 101A and agent device 210. Such changes may make various words within the word clouds larger or smaller, depending on changes to the frequency, volume, emotion, tone, and other attributes of words spoken during the conversation between the users.

Agent device 210 may present a user interface that is based on communications between one or more user devices 101 and agent device 210. For instance, in some examples, user interface module 288 uses the information about ongoing communications between the users of user devices 101A and agent device 210 to adjust data used to present a user interface at agent device 210. Such adjustments may involve including or omitting various user interface options that may pertain to the conversation taking place between the users of user device 101A and agent device 210 (e.g., including relevant options, omitting less relevant options). To do so, user interface module 288 may analyze one or transcripts, word clouds, joint word clouds (e.g., a combination of customer word cloud 401 and agent word cloud 410), or other artifacts derived from communications between user device 101A and agent device 210. After such an analysis, user interface module 288 causes communication unit 275 to output a signal over network 105. Communication unit 215 of agent device 210 detects a signal and outputs information about the signal to user interface module 221. User interface module 221 determines that the signal includes information sufficient to present, update, or modify a user interface. User interface module 221 causes output device 217 (e.g., a display device) to present, update, or modify a user interface, where such a user interface reflects the analysis, performed by user interface module 288, of the communications between the users operating user device 101A and agent device 210.

Computing system 270 may perform actions based on interactions with a user interface presented at agent device 210. For instance, still referring to the example being described with reference to FIG. 2 and FIG. 3A, input device 216 of agent device 210 detects input that user interface module 221 determines corresponds to a selection of a user interface element (e.g., a button within agent user interface 301A). User interface module 221 causes communication unit 215 to output a signal over network 105. Communication unit 275 of computing system 270 detects a signal and outputs information about the signal to action module 286. Action module 286 determines that the signal corresponds to a request to perform an action (e.g., make an adjustment to an account, move money, pay or refund fees, communicate with other personnel at the organization, adjust permissions associated with a customer's account, open or close an account, or other actions). To identify the action to be performed, action module 286 may analyze one or more word clouds to determine the most relevant topics or action categories. Action module 286 identifies the requested action, and causes the requested action to be performed. In some examples, computing system 270 may be capable of performing the action independently. In other examples, computing system 270 may communicate with other systems over network 105 (or another network) to cause such other systems to perform the action. Such other systems may be operated and/or controlled by the same organization operating and/or controlling computing system 270. In other examples, such other systems may be operated and/or controlled by a different organization.

Figure 3B:
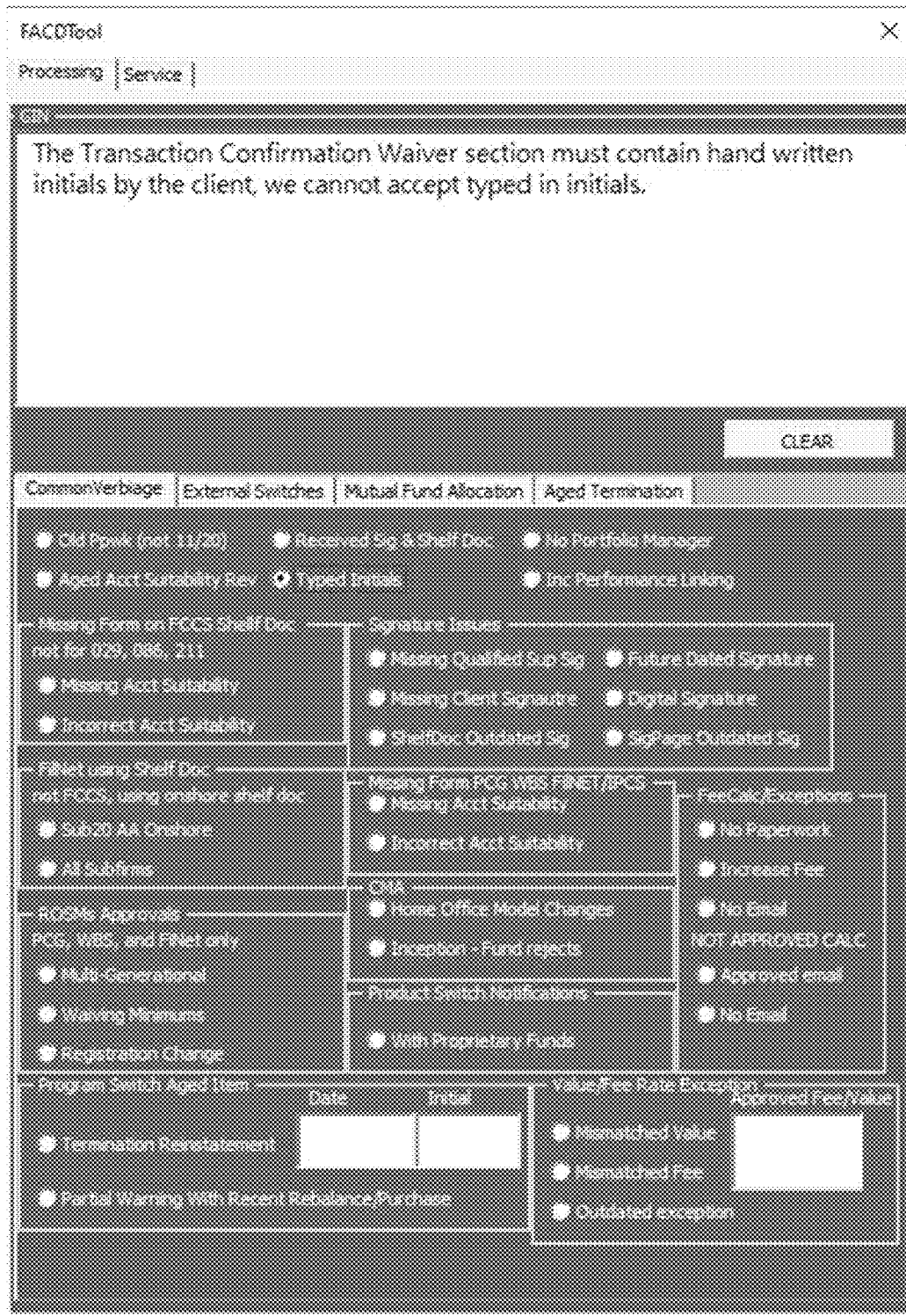
Figure 3C:
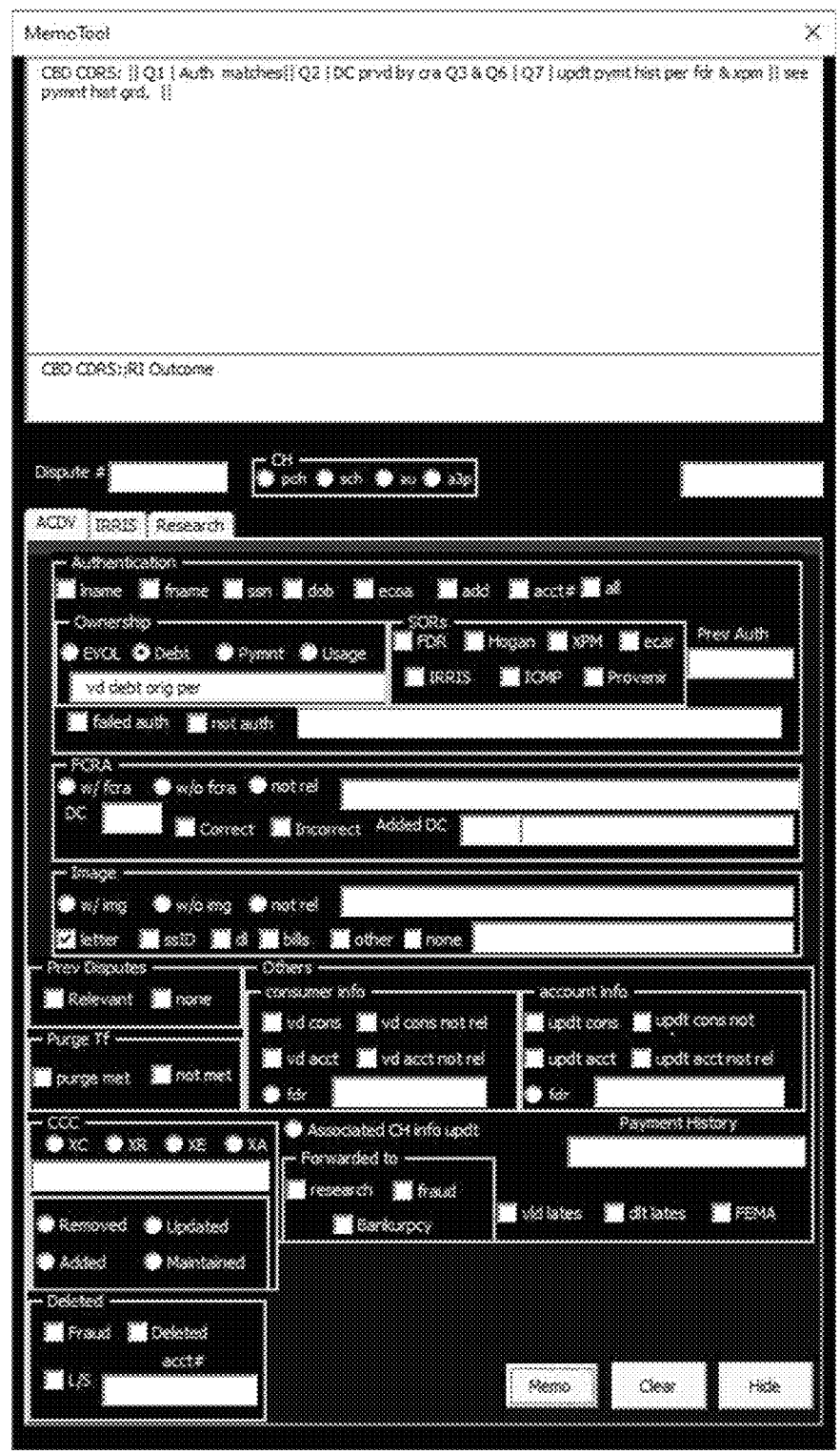

FIG. 3B and FIG. 3C are conceptual diagrams illustrating alternative user interfaces presented by an agent computing device for facilitating record-keeping, note-taking, and process management, in accordance with one or more aspects of the present disclosure. The user interfaces in FIGS. 3B and 3C may represent alternative examples of user interfaces that may be presented in a different context than the context described in connection with FIG. 3A. For instance, the user interfaces of FIGS. 3A and 3B may be used by different lines of business within a bank or different branches of an organization.

FIG. 4A is a conceptual diagram illustrating an example word cloud corresponding to words spoken by a user or banking customer, in accordance with one or more aspects of the present disclosure. FIG. 4B is a conceptual diagram illustrating an example word cloud corresponding to words spoken by an agent or bank representative, in accordance with one or more aspects of the present disclosure.

In the examples shown in FIGS. 4A and 4B, words that are used frequently are presented in customer word cloud 401 and/or agent word cloud 410 in a larger font size than those used less frequently. Alternatively, or in addition, words that are uses with a higher tone, with more emotion, with greater emphasis, and/or spoken at a higher volume, may be presented within customer word cloud 401 and/or agent word cloud 410 in a larger font size. In addition, terms that have attributes of interdependency between two or more parties to a call, meaning that the spoken words are both used frequently by the parties to the or communication, or are used by two or more parties to the call with similar tone, emotion, emphasis, and/or volume, may also be presented in a larger font size (or in a different color or otherwise emphasized).

Figure 5:
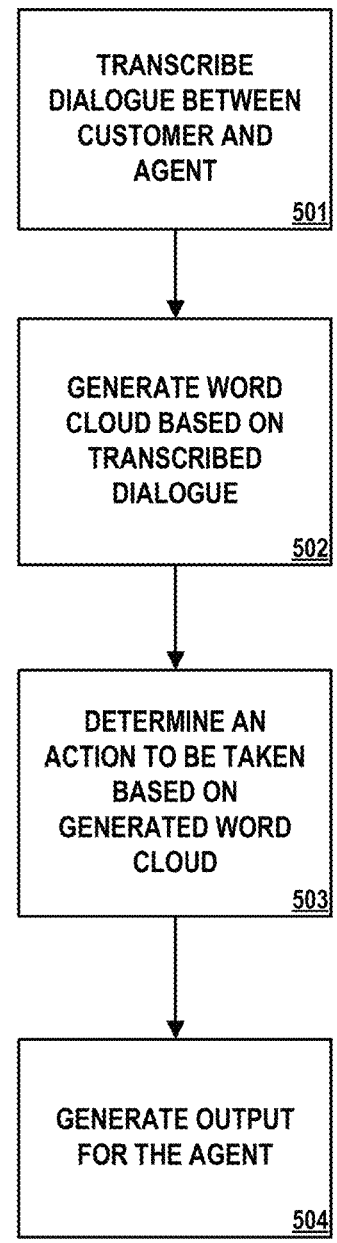
FIG. 5 is a flow diagram illustrating operations performed by an example computing system in accordance with one or more aspects of the present disclosure.

FIG. 5 is a flow diagram illustrating operations performed by an example computing system in accordance with one or more aspects of the present disclosure. FIG. 5 is described below within the context of computing system 170 of FIG. 1. In other examples, operations described in connection with FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In some examples, the process illustrated in FIG. 5 may be implemented to reduce time that bank representatives would require in taking notes while listening to bank customer problems/queries over a call. For instance, there may be possibilities that some points mentioned by the bank customers may be missed by the bank representatives. Missing of such points may tend to lead to negative outcomes, such as incorrect actions taken on a user's bank account.

In the process illustrated in FIG. 5, and in accordance with one or more aspects of the present disclosure, computing system 170 may transcribe dialogue between a customer and an agent (501). For example, computing system 170 may transcribe the conversation between the bank customer and the bank representative, in which the bank customer states their problems/queries. Computing system 170 notes all the words spoken by the bank customer and bank representative during their conversation, and accordingly arranges all the words into a written format in the form of sentences. Computing system 170 may simultaneously perform the transcription while the conversation between the bank customer and bank representative is taking place.

Computing system 170 may generate a word cloud based on transcribed dialogue (502). For example, computing system 170 may generate word clouds based on the transcribed conversation between the bank customer and the bank representative, while the two are speaking. For instance, a customer word cloud is generated while the customer is speaking, and an agent word cloud is generated while the bank representative is speaking. Computing system 170 generates the customer word cloud based on the frequency of words used and an emphasis placed on the words spoken by the bank customer. Emphasis may be determined based on a volume, tone, and emotion of the bank customer while speaking. The agent word cloud is generated based on the frequency of words used and an emphasis placed on the words while the bank representative is speaking. The customer word cloud and the agent word cloud are displayed on the agent device while the bank customer and bank representative are speaking.

Computing system 170 may determine an action to be taken based on the generated word cloud (503). For example, computing system 170 may determine a banking action to be taken based on based on the generated word clouds. Computing system 170 may determine the correct banking action to be taken by analyzing the generated word clouds using a SVM algorithm.

Computing system 170 may generate output for presentation at agent device 110 (504). For example, computing system 170 generates a user interface for presentation on agent device 110. For example, computing system 170 outputs a signal over network 105. Agent device 110 detects a signal over network 105 and determines that the signal includes information sufficient to generate a user interface. Agent device 110 generates a user interface and presents it at a display associated with agent device 110. In some examples, the user interface displays or presents the correct banking action to be taken based on the conversation taking place. The agent (i.e., operating agent device 110) may select the displayed banking action to be performed, which may then cause an appropriate action to be taken to resolve the bank customer problem/query. Computing system 170 may also generate the user interface to exclude irrelevant options/banking actions that are not related to the problem/query stated by the bank customer during their conversation with the bank representative, thereby reducing the possibility of the agent performing an incorrect banking action.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are hereby incorporated by reference. To the extent that any such disclosure material that is incorporated by reference conflicts with the present disclosure, the present disclosure shall control.

For ease of illustration, only a limited number of devices (e.g., user devices 110, entity computing systems 141, computing systems 170, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   analyzing, by a computing system, communications between a customer of an organization and an agent of the organization, where the communications include an issue to be addressed by the organization;
   generating, by the computing system, artifacts of the communications between the customer and the agent wherein the artifacts include a data structure storing important words from a plurality of words spoken by at least one of the customer or the agent;
   determining, by the computing system and based on the artifacts of the communications, an action to be taken to address the issue; and
   generating, by the computing system and based on the data structure, at least one user interface providing options associated with addressing the issue, wherein the at least one user interface further includes a word cloud visual representation of the plurality of words in which the important words from the plurality of words are visually emphasized.

2. The method of claim 1, wherein determining the action to be taken includes:
   determining the action by identifying a word spoken by both the customer and by the agent; and
   identifying dependencies between use of the word spoken by both the customer and by the agent.

3. The method of claim 2, wherein the important words from the plurality of words are determined based on at least one of:
   a tone, emotion, or frequency of the word as spoken by at least one of the customer and by the agent; and
   wherein visually emphasizing the important words in the word cloud visual representation includes at least one of changing size or color.

4. The method of claim 1, wherein generating artifacts of the communications between the customer and the agent further includes:
   generating a transcript of a conversation between the customer and the agent.

5. The method of claim 4, wherein generating artifacts of the communications between the customer and the agent further includes:
   generating, based on the transcript, a data structure representing a word cloud of words spoken by the customer; and
   generating, based on the transcript, a data structure representing a word cloud of words spoken by the agent.

6. The method of claim 5, wherein generating the at least one user interface further includes:
   generating the word cloud visual representation based on words spoken by the customer, wherein the words spoken by the customer that are used frequently and with emotion are visually emphasized in the word cloud visual representation.

7. The method of claim 6, wherein generating the at least one user interface further includes:
   generating a second word cloud visual representation based on words spoken by the agent, wherein the words spoken by the agent that are used frequently and with emotion are visually emphasized in the second word cloud visual representation.

8. The method of claim 6, wherein determining an action to be taken includes:
   analyzing frequency and emotion associated with words spoken by the customer.

9. The method of claim 7, wherein determining an action to be taken further includes:
   analyzing frequency and emotion associated with words spoken by both the customer and the agent.

10. The method of claim 1, wherein generating the at least one user interface further includes:
    generating the word cloud visual representation to include a visualization of a word spoken by both the customer and the agent based on both frequency and emotion associated with the word spoken by the customer and frequency and emotion associated with the word spoken by the agent during a conversation between the customer and the agent; and
    dynamically modifying the visual emphasis placed on the word in the at least one user interface as frequency and emotion associated with the word changes during the conversation.

11. A computing system comprising processing circuitry and a storage device, wherein the processing circuitry has access to the storage device and is configured to:
    analyze communications between a customer of an organization and an agent of the organization, where the communications include an issue to be addressed by the organization;
    generate artifacts of the communications between the customer and the agent, wherein the artifacts include a data structure storing important words from a plurality of words spoken by at least one of the customer or the agent;
    determine, based on the artifacts of the communications, an action to be taken to address the issue; and
    generate, based on the data structure, at least one user interface providing options associated with addressing the issue, wherein the at least one user interface further includes a word cloud visual representation of the plurality of words in which the important words from the plurality of words are visually emphasized.

12. The computing system of claim 11, wherein to determine the action to be taken, the processing circuitry is further configured to:
    determine the action by identifying a word spoken by both the customer and by the agent; and
    identify dependencies between use of the word spoken by both the customer and by the agent.

13. The computing system of claim 12, wherein the important words from the plurality of words are determined based on at least one of:
    a tone, emotion, or frequency of the word as spoken by at least one of the customer and by the agent; and
    wherein visually emphasizing the important words in the word cloud visual representation includes at least one of changing size or color.

14. The computing system of claim 11, wherein to generate artifacts of the communications between the customer and the agent, the processing circuitry is further configured to:
    generate a transcript of a conversation between the customer and the agent.

15. The computing system of claim 14, wherein to generate artifacts of the communications between the customer and the agent, the processing circuitry is further configured to:
    generate, based on the transcript, a data structure representing a word cloud of words spoken by the customer; and
    generate, based on the transcript, a data structure representing a word cloud of words spoken by the agent.

16. The computing system of claim 15, wherein to generate the at least one user interface, the processing circuitry is further configured to:
    generate the word cloud visual representation based on word cloud of words spoken by the customer, wherein the words spoken by the agent that are used frequently and with emotion are visually emphasized in the word cloud visual representation.

17. The computing system of claim 16, wherein to generate the at least one user interface, the processing circuitry is further configured to:
    generate a second word cloud visual representation based on words spoken by the agent, wherein the words spoken by the agent that are used frequently and with emotion are visually emphasized in the second word cloud visual representation.

18. The computing system of claim 16, wherein to determine an action to be taken, the processing circuitry is further configured to:

analyze frequency and emotion associated with words spoken by the customer.

19. The computing system of claim 17, wherein to determine an action to be taken, the processing circuitry is further configured to:

analyze frequency and emotion associated with words spoken by both the customer and the agent.

20. A non-transitory computer-readable medium comprising instructions that, when executed, cause processing circuitry of a computing system to:

analyze communications between a customer of an organization and an agent of the organization, where the communications include an issue to be addressed by the organization;

generate artifacts of the communications between the customer and the agent, wherein the artifacts include a data structure storing important words from a plurality of words spoken by at least one of the customer or the agent;

determine, based on the artifacts of the communications, an action to be taken to address the issue; and generate, based on the data structure, at least one user interface providing options associated with addressing the issue, wherein the at least one user interface further includes a word cloud visual representation of the plurality of words in which the important words from the plurality of words are visually emphasized.

* * * * *